United States Patent
Inoue et al.

(10) Patent No.: US 7,583,850 B2
(45) Date of Patent: Sep. 1, 2009

(54) IMAGE-PROCESSING APPARATUS AND METHOD

(75) Inventors: Hisashi Inoue, Fukuoka (JP); Kenichi Noridomi, Fukuoka (JP); Masataka Ejima, Iizuka (JP)

(73) Assignee: Panasonic Corporation, Osaka (JP)

( * ) Notice: Subject to any disclaimer, the term of this patent is extended or adjusted under 35 U.S.C. 154(b) by 951 days.

(21) Appl. No.: 11/017,883

(22) Filed: Dec. 22, 2004

(65) Prior Publication Data

US 2005/0141748 A1 Jun. 30, 2005

(30) Foreign Application Priority Data

Dec. 26, 2003 (JP) ............................. 2003-433157

(51) Int. Cl.
*G06K 9/36* (2006.01)
(52) U.S. Cl. ..................... 382/251; 382/232; 382/233
(58) Field of Classification Search ................ 382/100, 382/232–251; 375/240.25
See application file for complete search history.

(56) References Cited

U.S. PATENT DOCUMENTS 6,064,764 A * 5/2000 Bhaskaran et al. .......... 382/183
6,618,489 B1 9/2003 Miyashita
6,621,866 B1 * 9/2003 Florencio et al. ....... 375/240.25
6,963,655 B1 * 11/2005 Tonegawa et al. ........... 382/100

FOREIGN PATENT DOCUMENTS

| EP | 1 148 733 | 10/2001 |
|---|---|---|
| EP | 1 395 036 | 3/2004 |
| JP | 2000-151973 | 5/2000 |
| JP | 2002-330279 | 11/2002 |
| WO | 02/091731 | 11/2002 |

\* cited by examiner

*Primary Examiner*—Duy M Dang
(74) *Attorney, Agent, or Firm*—Wenderoth, Lind & Ponack, L.L.P.

(57) ABSTRACT

A bit stream is decoded to generate first quantized DCT-coefficients. The first quantized DCT-coefficients are inversely quantized using a first quantization table, thereby generating DCT-coefficients. The resulting DCT-coefficients are quantized using a second quantization table, thereby generating second quantized DCT-coefficients. Elements in the second quantization table are smaller in value than those in the first quantization table. Predetermined additional information is embedded into the second quantized DCT-coefficients. The second quantized DCT-coefficients having the additional information embedded therein are encoded to produce a bit stream having the additional information embedded therein. The second quantization table is set to be smaller in value than the first quantization table.

7 Claims, 9 Drawing Sheets

Fig. 3 first quantization table

| 16 | 11 | 10 | 16 | 24 | 40 | 51 | 61 |
|----|----|----|----|----|----|----|----|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 4 second quantization table

| 8 | 5 | 5 | 8 | 12 | 20 | 25 | 30 |
|---|---|---|---|----|----|----|----|
| 6 | 6 | 7 | 9 | 13 | 29 | 30 | 27 |
| 7 | 6 | 8 | 12 | 20 | 28 | 34 | 28 |
| 7 | 8 | 11 | 14 | 25 | 43 | 40 | 31 |
| 9 | 11 | 18 | 28 | 34 | 54 | 51 | 38 |
| 12 | 17 | 27 | 32 | 40 | 52 | 56 | 46 |
| 24 | 32 | 39 | 43 | 51 | 60 | 60 | 50 |
| 36 | 46 | 47 | 49 | 56 | 50 | 51 | 49 |

Fig. 5 second quantization table

| 8 | 5 | 5 | 8 | 24 | 40 | 51 | 61 |
|---|---|---|---|----|----|----|----|
| 6 | 6 | 7 | 9 | 26 | 58 | 60 | 55 |
| 7 | 6 | 8 | 12 | 40 | 57 | 69 | 56 |
| 7 | 8 | 11 | 14 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

Fig. 7(a)

quantized DCT coefficients

| 16 | 4 | -2 | 0 | 0 | 0 | 0 | 0 |
|---|---|---|---|---|---|---|---|
| -7 | 3 | 0 | 0 | 0 | 0 | 0 | 0 |
| 0 | -1 | 0 | 0 | 0 | 0 | 0 | 0 |
| -1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

first quantization table

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

DCT coefficients

| 256 | 44 | -20 | 0 | 0 | 0 | 0 | 0 |
|---|---|---|---|---|---|---|---|
| -84 | 36 | 0 | 0 | 0 | 0 | 0 | 0 |
| 0 | -13 | 0 | 0 | 0 | 0 | 0 | 0 |
| -14 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 8(a)

DCT coefficients

| 256 | 44 | -20 | 0 | 0 | 0 | 0 | 0 |
|---|---|---|---|---|---|---|---|
| -84 | 36 | 0 | 0 | 0 | 0 | 0 | 0 |
| 0 | -13 | 0 | 0 | 0 | 0 | 0 | 0 |
| -14 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

$\div$

Fig. 8(b)

second quantization table

| 8 | 5 | 5 | 8 | 12 | 20 | 25 | 30 |
|---|---|---|---|---|---|---|---|
| 6 | 6 | 7 | 9 | 13 | 29 | 30 | 27 |
| 7 | 6 | 8 | 12 | 20 | 28 | 34 | 28 |
| 7 | 8 | 11 | 14 | 25 | 43 | 40 | 31 |
| 9 | 11 | 18 | 28 | 34 | 54 | 51 | 38 |
| 12 | 17 | 27 | 32 | 40 | 52 | 56 | 46 |
| 24 | 32 | 39 | 43 | 51 | 60 | 60 | 50 |
| 36 | 46 | 47 | 49 | 56 | 50 | 51 | 49 |

quantized DCT coefficients

| 32 | 9 | -4 | 0 | 0 | 0 | 0 | 0 |
|---|---|---|---|---|---|---|---|
| -14 | 6 | 0 | 0 | 0 | 0 | 0 | 0 |
| 0 | -2 | 0 | 0 | 0 | 0 | 0 | 0 |
| -2 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 10(a)

embedding information (13, 46) ⇒ (0, 0, 0, 0, 1, 1, 0, 1, 0, 0, 1, 0, 0, 1, 1, 0)

| 32 | 9 | −4 | 0 | 0 | 0 | 0 | 0 |
|---|---|---|---|---|---|---|---|
| −14 | 6 | 0 | 0 | 0 | 0 | 0 | 0 |
| 0 | −2 | 0 | 0 | 0 | 0 | 0 | 0 |
| −2 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

| 32 | 8 | −3 | 0 | 1 | 0 | 0 | 0 |
|---|---|---|---|---|---|---|---|
| −14 | 5 | 1 | 1 | 0 | 0 | 0 | 0 |
| 0 | −2 | 0 | 0 | 0 | 0 | 0 | 0 |
| −2 | 0 | 0 | 0 | 0 | 0 | 0 | 0 |
| 1 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |
| 0 | 0 | 0 | 0 | 0 | 0 | 0 | 0 |

Fig. 11(a)

| 256 | 45 | -20 | 0 | 0 | 0 |
|---|---|---|---|---|---|
| -84 | 36 | 0 | 0 | 0 | 0 |
| 0 | -12 | 0 | 0 | 0 | 0 |
| -14 | 0 | 0 | 0 | 0 | 0 |
| 0 | 0 | 0 | 0 | 0 | 0 |

Fig. 11(b)

| 256 | 40 | -15 | 0 | 12 | 0 |
|---|---|---|---|---|---|
| -84 | 30 | 7 | 9 | 0 | 0 |
| 0 | -12 | 0 | 0 | 0 | 0 |
| -14 | 0 | 0 | 0 | 0 | 0 |
| 0 | 0 | 0 | 0 | 0 | 0 |

Fig. 11(c)  Prior Art

| 256 | 44 | -10 | 0 | 24 | 0 |
|---|---|---|---|---|---|
| -72 | 36 | 14 | 19 | 0 | 0 |
| 0 | 0 | 0 | 0 | 0 | 0 |
| 0 | 0 | 0 | 0 | 0 | 0 |
| 18 | 0 | 0 | 0 | 0 | 0 |

IMAGE-PROCESSING APPARATUS AND METHOD

BACKGROUND OF THE INVENTION

1. Field of the Invention

The present invention relates to an apparatus and method operable to embed a mass of additional information into quantized frequency image data.

2. Description of the Related Art

In recent years, digital content such as digitized audio and video data has been on the increase. Digital content provides a perfectly faithful reproduction of its original, and therefore it is an important issue to protect the copyright of the digital content. Illegally reproduced or distributed content cannot be differentiated from corresponding original content, and it is difficult to demonstrate evidence to assert the copyright of the original content. Accordingly, efforts have been made to protect the copyright of the digital content.

To this end, a typical "digital watermark" is used as one of the efforts. The digital watermark is a known art in which data is embedded into the audio and video data without allowing human beings to perceive the presence of the embedded data therein, and to extract the embedded data from the embedded data-containing audio and video data. According to the known art, copyright information such as on a copyright holder's name and copyright date is embedded as the digital watermark into the audio or video data in order to protect the copyright of the digital content. As a result, the embedded copyright information is detectable from illegally reproduced content, and the copyright holder of the content is identified to prevent the illegal reproduction of the digital content. In addition, digital content having the copyright information extensively embedded therein throughout the digital content makes it feasible to pinpoint specific locations of tampered data as well as the presence of the tampered data.

Several methods have been proposed to embed additional information into encoded image data having images compressed in accordance with any international standard specification such as JPEG and MPEG, and to extract the additional information from the encoded image data upon the decoding of the encoded image data.

For example, Patent Reference No. 1 (Published Japanese patent application 2002-330279) discloses a method operable to both embed and extract data from images.

To embed the data into the images, each original image is divided into several blocks, each of which is of 8×8 pixels. Subsequently, all of the blocks that form the entire image experiences discrete cosine transformation (DCT), thereby generating frequency image data or rather DCT coefficients herein. Each of the blocks is quantized using a quantization table, thereby providing quantized frequency image data in which a single coefficient at the highest frequency domain is replaced by one-bit data. The replacement allows the data to be embedded, as expected, into the quantized frequency image data. Thereafter, run-length encoding and Huffman coding are executed in order. Subsequently, a value corresponding to a single coefficient at the highest frequency domain among values in the quantization table is replaced by "1" (one).

In JPEG-encoding based apparatuses such as digital cameras and color facsimiles, input images are both encoded and compressed by hardware, and a considerable amount of cost is incurred when a digital watermark-embedding step is added to be followed by such an image-compressing and -encoding step. To avoid such an inconvenience, digital watermark information may be embedded into either encoded data or quantized frequency image data, after the receipt of either the encoded data or quantized frequency image data, in accordance with either a table used to encode such input data or a table used to quantize the input data.

However, according to Patent Reference No. 1, in order to embed massive additional information of at least several hundred bytes into the encoded image data having images compressed therein, the quantized frequency image data in each of the blocks must be replaced by one-bit data in accordance with quantities (in general, any number except for "1") corresponding to desired pieces of data to be embedded.

DCT-coefficients in high frequency domain components often result in "0" (zero) because of the quantization, and a series of "0's" (zeros) sometimes appears extending to the tail of each of the high frequency domain components. Such a property is utilized by encoding-decoding processes. More specifically, the series of "0's" extending to the tail of the high frequency domain component is replaced by a particular code or an EOB (End of Block) in a zigzag-scanning path that begins at a direct-current component, and that terminates at the end of the high frequency domain component. The EOB-based replacement allows a chain of several "0's" up to several tens of "0's" to be replaced only by a single code, and codes in a considerably reduced amount are usable.

However, according to the known arts, when a single coefficient at the highest frequency domain is replaced by "1", then the tail of the high frequency domain component results in "1". This means that the chain of "0's" extending to the tail of the high frequency domain component is absent. As a result, the EOB-based replacement is unachievable, and codes are significantly increased in amount.

Although it cannot be impossible to replace DCT-coefficients in intermediate and low frequency domain components, it is to be noted that the replacement of a single coefficient at the highest frequency domain in accordance with the aforesaid art is not believed to result in much degradation in image quality. In contrast, the replacement of the DCT-coefficients in the intermediate and low frequency domain components inevitably degrades the image quality because the replaced DCT-coefficients are closely related to the image quality, and because they are relatively great in value.

Patent Reference No. 2 (Published Japanese patent application 2000-151973) discloses the embedding of a mass of additional information into image data. It is to be noted that a sum of absolute values of differences between frequency image data before information embedment therein and frequency image data after the information embedment therein is preferably as small as possible because an increased sum of the absolute values means a big change in image quality, or more specifically, means that post-embedded images having information embedded therein are considerably reduced in image quality than pre-embedded images.

Inverse quantization primarily multiplies each value in the quantization table by corresponding value of the quantized frequency image data. In general, the values in the quantization table considerably increase with a relatively high compression ratio. Since the quantization table provides very high values (e.g., "100") as a result of the relatively high compression ratio, a slight change (e.g., "+1") in value of the quantized frequency image data in accordance with Patent Reference No. 2 to embed the information thereinto brings about an increase (difference: +1*100=+100) several times up to several hundred or more as great as the slight change. This causes a problem in that the information embedment into the quantized frequency image data materially degrades decoded images in image quality.

OBJECTS AND SUMMARY OF THE INVENTION

In view of the above, an object of the present invention is to provide an image-processing apparatus operable to embed a mass of additional information into input data while suppressing degradation in image quality of the input data, even when the input data is encoded at a high compression ratio.

A first aspect of the present invention provides an image-processing apparatus including a first quantization table, a second quantization table, an inverse quantization unit, a quantization unit, and an information-embedding unit. The second quantization table differs from the first quantization table. The inverse quantization unit is operable to inversely quantize first quantized data using the first quantization table, thereby generating frequency image data. The quantization unit is operable to quantize the frequency image data using the second quantization table, thereby generating second quantized data. The information-embedding unit is operable to embed additional information into the second quantized data.

A second aspect of the present invention provides an image-processing apparatus as defined in the first aspect of the present invention, in which each of the first and second quantization tables includes elements at which the additional information is to be embedded, and in which the elements in the second quantization table are smaller in value than the elements in the first quantization table.

The above construction avoids the aforesaid drawback in which large numbers in the quantization table tend to amplify results from a slight change in value of quantized frequency image data due to the additional information embedment into the quantized frequency image. As a result, a mass of additional information can be embedded into any input data encoded at a variety of compression ratios, while degradation in image quality of the input data is suppressed.

The above, and other objects, features and advantages of the present invention will become apparent from the following description read in conjunction with the accompanying drawings, in which like reference numerals designate the same elements.

BRIEF DESCRIPTION OF THE DRAWINGS

FIG. 3 is an illustration showing, as an illustrative example, a first quantization table according to the first embodiment;

FIG. 4 is an illustration showing, as an illustrative example, a second quantization table according to the first embodiment;

FIG. 5 is an illustration showing, as an illustrative example, another second quantization table according to the first embodiment;

FIG. 7(a) is an illustration showing, as an illustrative example, quantized DCT-coefficients according to the first embodiment;

FIG. 7(b) is an illustration showing, as an illustrative example, the first quantization table according to the first embodiment;

FIG. 7(c) is an illustration showing, as an illustrative example, DCT-coefficients according to the first embodiment;

FIG. 8(a) is an illustration showing, as an illustrative example, DCT-coefficients according to the first embodiment;

FIG. 8(b) is an illustration showing, as an illustrative example, the second quantization table according to the first embodiment;

FIG. 8(c) is an illustration showing, as an illustrative example, quantized DCT-coefficients according to the first embodiment;

FIG. 10(a) is a descriptive illustration showing an information-embedding method according to the first embodiment;

FIG. 10(b) is an illustration showing, as an illustrative example, a result from the information-embedding method according to the first embodiment;

FIG. 11(a) is an illustration showing, as an illustrative example, pre-embedded DCT-coefficients according to the first embodiment;

FIG. 11(b) is an illustration showing, as illustrative example, post-embedded DCT-coefficients according the first embodiment, and FIG. 11(c) is an illustration showing, as an illustrative example, post-embedded DCT-coefficients according a comparative example.

DETAILED DESCRIPTION OF THE PREFERRED EMBODIMENT

A preferred embodiment of the present invention is now described with reference to the accompanying drawings.

First Embodiment

Figure 1:
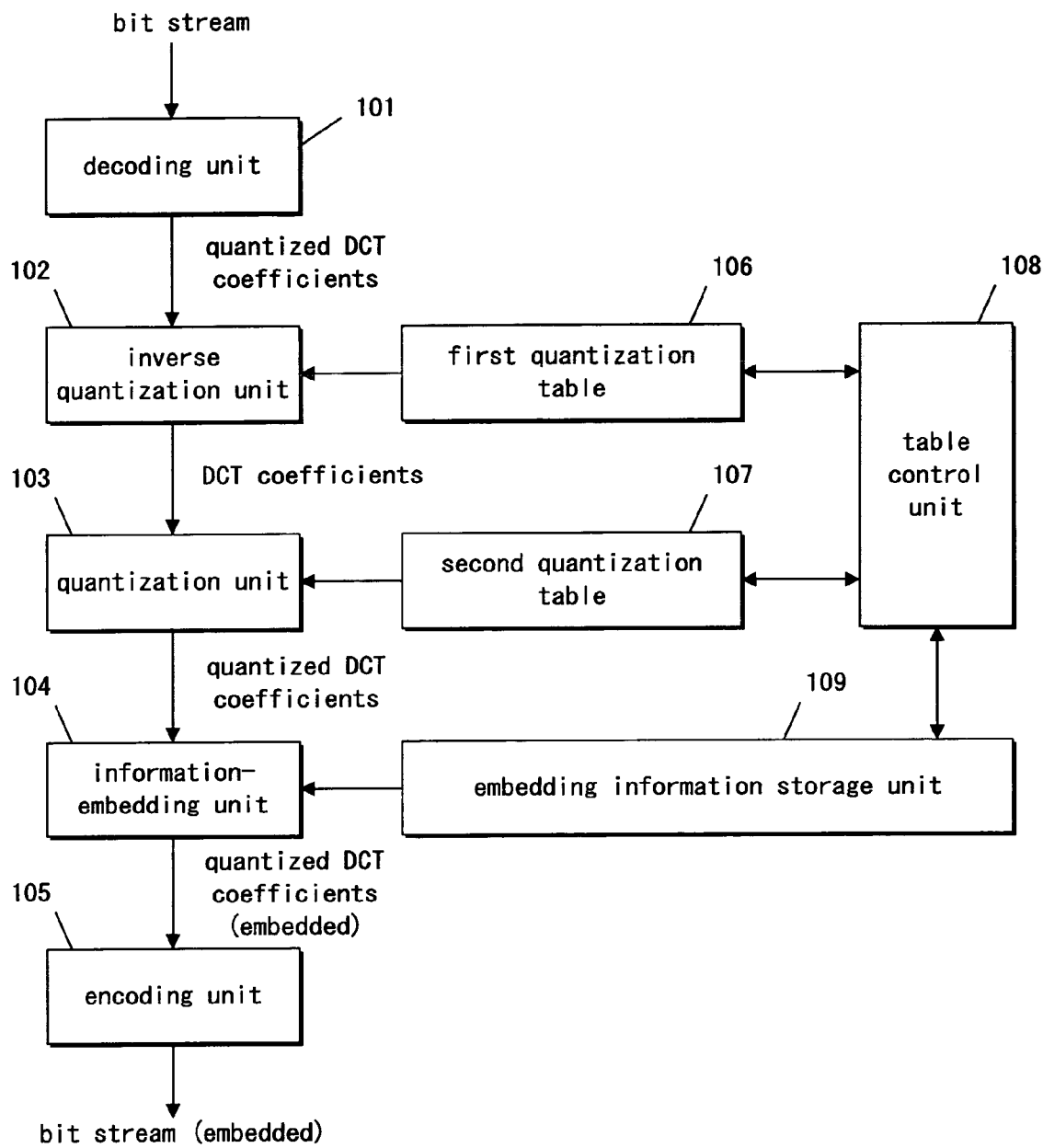
FIG. 1 is a block diagram illustrating an image-processing apparatus according to a first embodiment of the present invention.

Referring to FIG. 1, an image-processing apparatus according to a first embodiment as illustrated in block diagram form is shown including a decoding unit 101, an inverse quantization unit 102, a quantization unit 103, an information-embedding unit 104, and an encoding unit 105. The image-processing apparatus further includes a first quantization table 106, a second quantization table 107, a table control unit 108, and an embedding information storage unit 109 operable to supply the information-embedding unit 104 with embedding information.

The decoding unit 101 is operable to decode a bit stream upon receipt of the bit stream, thereby generating quantized frequency image data or quantized DCT-coefficients. The inverse quantization unit 102 is operable to inversely quantize the quantized DCT-coefficients using a first quantization table 106 as illustrated in FIG. 3, thereby generating DCT-coefficients. For example, assume that the quantized DCT-coefficients and the first quantization table 106 are as illustrated in FIGS. 7(a) and 7(b), respectively. In this instance, the inverse quantization unit 102 provides DCT coefficients as illustrated in FIG. 7(c).

The quantization unit 103 is operable to quantize the DCT-coefficients using a second quantization table 107 as illustrated in either FIG. 4 or FIG. 5, thereby generating quantized DCT-coefficients. For example, assume that the DCT-coefficients and the second quantization table 107 are as illustrated in FIG. 8(a) and FIG. 8(b), respectively. In this instance, the quantization unit 103 provides quantized DCT coefficients as illustrated in FIG. 8(c).

As discussed later, pursuant to the present embodiment, the first and second quantization tables 106, 107 are controlled by the table control unit 108. However, the table control unit 108 may be eliminated when both of the first and second quantization tables 106, 107 can invariably be determined in advance.

The information-embedding unit 104 is operable to embed embedding information into the quantized DCT-coefficients from the quantization unit 103 in accordance with regulations as discussed later, upon receipt of the embedding information from the embedding information storage unit 109.

The encoding unit 105 is operable to encode the quantized DCT-coefficients having the embedding information embedded therein by the information-embedding unit 104, thereby generating a bit stream.

The following discusses in detail the way in which embedding information (13, 46) as illustrated in FIG. 10(a) is embedded. In the description as given below, assume that the first quantization table 106 is as illustrated in FIG. 3.

Figure 6:
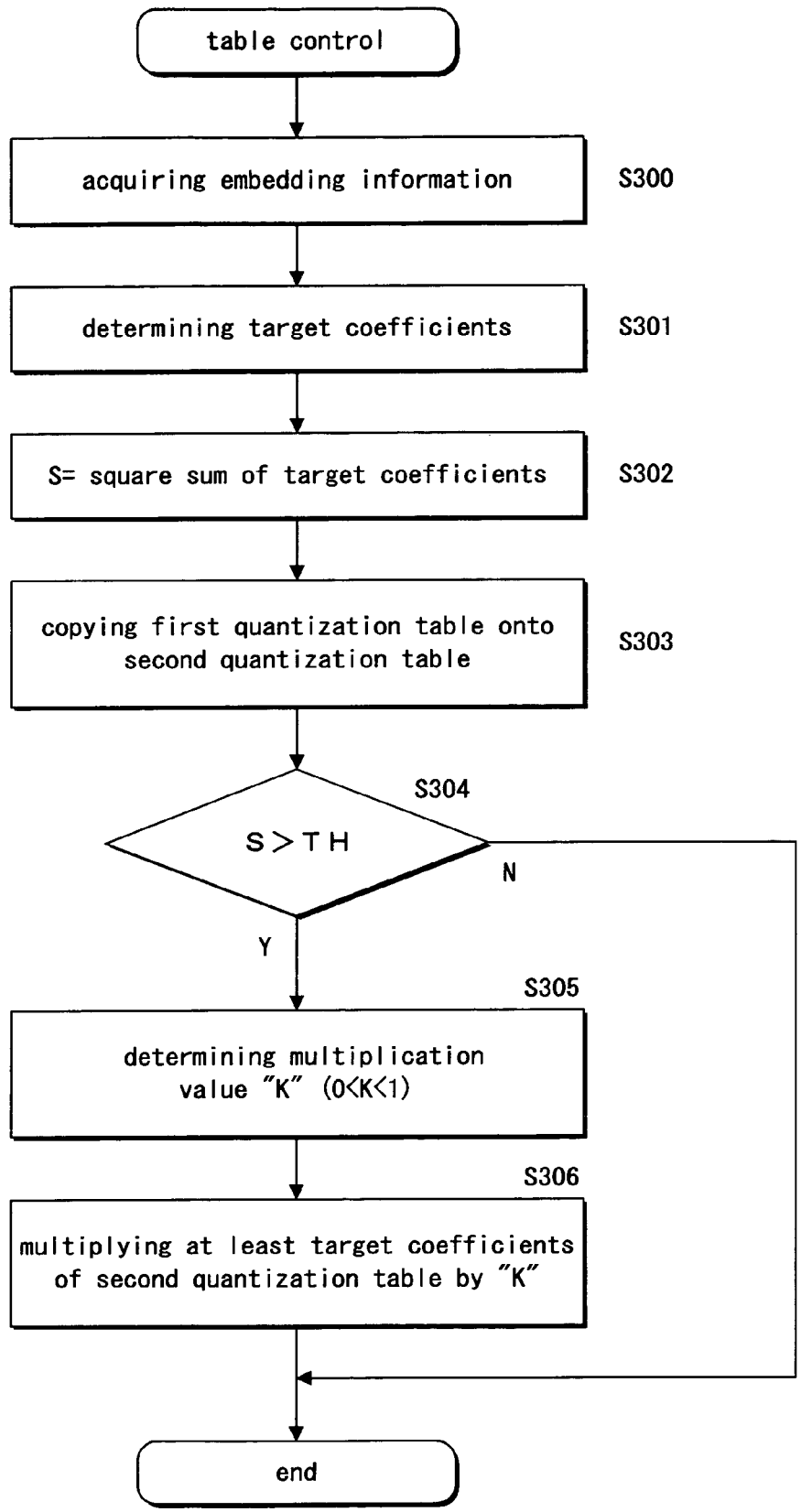
FIG. 6 is a flowchart illustrating a course of action provided by a table control unit according to the first embodiment.

Referring to FIG. 6, at step 300, the table control unit 108 is shown binarizing the embedding information (13, 46) upon receipt thereof from the embedding information storage unit 109. As a result, a bit string having the 16-bit length of (0, 0, 0, 0, 1, 1, 0, 1, 0, 0, 1, 0, 0, 1, 1, 0) is provided. At step 301, the table control unit 108 determines, on the basis of the binarized embedded information (13, 46), positions of target coefficients in which the information is to be embedded. Referring to FIG. 10(a), assume that sixteen numbers of target coefficients as illustrated by arrow "N" are determined in accordance with a zigzag-scanning path that begins at a direct-current component.

At step 302, the table control unit 108 determines a square sum "S" based on target coefficients (16, 11, 12, 14 to 24, and 40) upon receipt of the target coefficients (16, 11, 12, 14 to 24, and 40) from the quantization table 106 of FIG. 3. At step 303, the table control unit 108 records a faithful reproduction of the first quantization table 106 directly onto the second quantization table 107.

At step 304, the table control unit 108 compares the square sum "S" in magnitude with a predetermined threshold "TH". When the comparison in step 304 results in S>TH, then it demonstrates relatively high values in the second quantization tale 107 and a high compression ratio. In this instance, the routine is advanced to step 305, at which the table control unit 108 determines a multiplication value "K" (0<K<1). The multiplication value "K" may be a predetermined certain value (e.g., K=0.5), or otherwise may be determined based on the square sum "S". At step 306, the table control unit 108 multiplies values in the second quantization table 107 by the multiplication value "K". With 0<K<1, the post-multiplied absolute values in the second quantization table 107 are, of course, smaller than the pre-multiplied values in the second quantization table 107.

Assuming that all of the values in the first quantization table 106 of FIG. 3 are multiplied by the multiplication value "K" (=0.5), the second quantization table 107 provides values as illustrated in FIG. 4. Alternatively, as illustrated in FIG. 5, only part of the values in the first quantization table 106 may be multiplied by the multiplication value "K" because the information is to be embedded into only the target coefficients.

When the comparison in step 304 results in S≦TH, then it demonstrates relatively low values in the second quantization table 107 and a low compression ratio. In this instance, according to the present embodiment, the table control unit 108 uses the values in the second quantization table 107 without any change therein. As a result, the same quantization table as the first quantization table 106 is used. However, the values in the quantization table may be multiplied, as an alternative, by any greater multiplication value (e.g., K=0.9).

Figure 9:
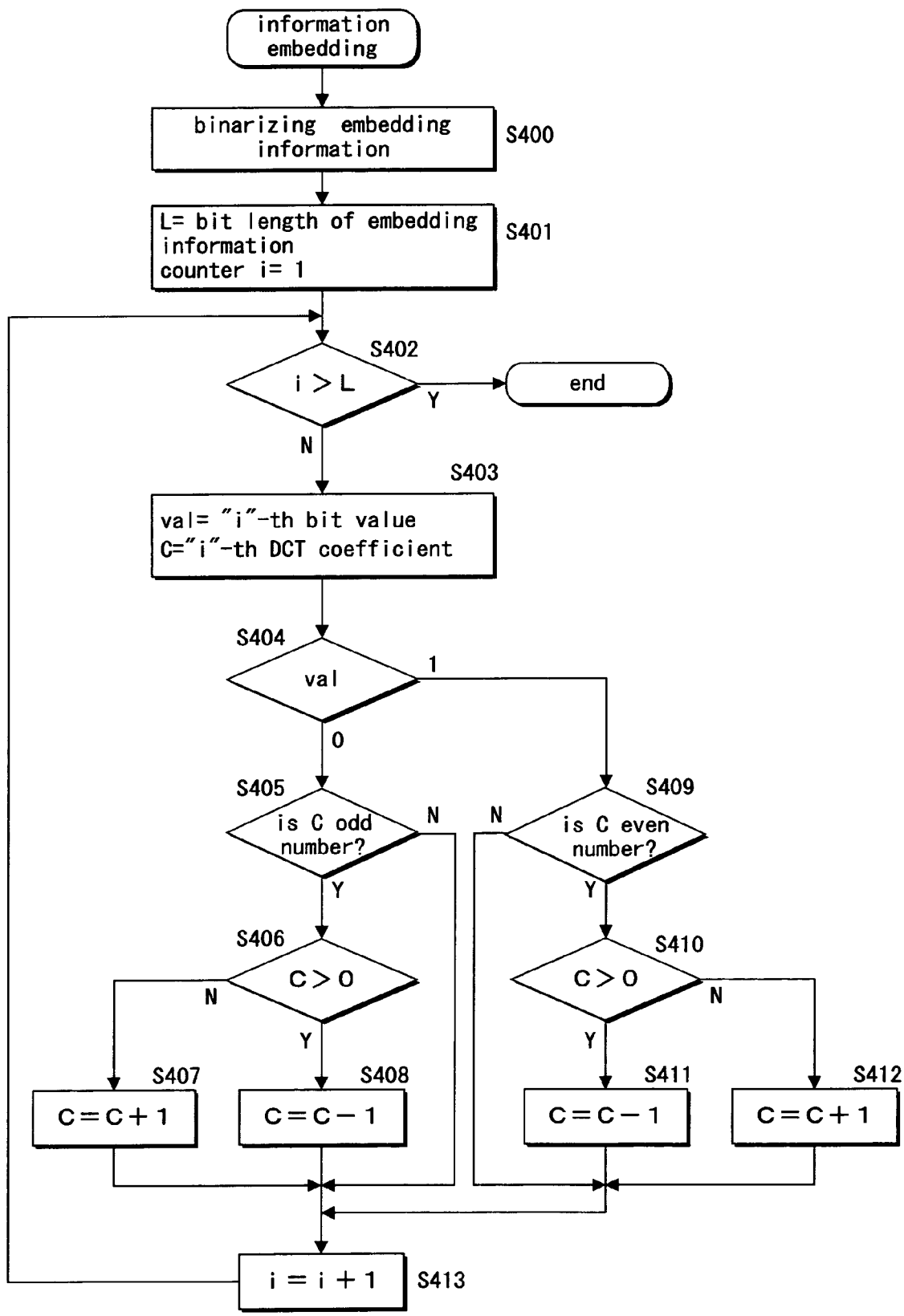
FIG. 9 is a flowchart illustrating a course of action provided by an information-embedding unit according to the first embodiment.

The following discusses, with reference to FIG. 9, a course of action provided by the information-embedding unit 104. The quantized DCT-coefficients from the quantization unit 103 enter the information-embedding unit 104. At step 400, the information-embedding unit 104 binarizes the embedding information upon receipt thereof from the embedding information storage unit 109. At step 401, the information-embedding unit 104 determines bit length "L" based on the binarized embedding information, and initializes a counter "i" to "1" (one). At subsequent steps including step 402, the bit manipulation of all bits, each of which bits has the bit length "L", is performed as discussed below by the information-embedding unit 104. The completion of the bit manipulation embeds the embedding information into the quantized DCT-coefficients.

More specifically, at step 403, the information-embedding unit 104 sets a value of an "i"-th bit in the embedding information to a variable "Val", and sets an "i"-th coefficient in the zigzag-scanning path among the quantized DCT-coefficients to a variable "C". In the zigzag-scanning path, the direct-current component is arrayed at the head thereof. See the arrow "N" of FIG. 10(a) for them.

At step 404, the routine is bifurcated by the variable "Val". When the variable "Val" is "0" (zero), then the routine is advanced to step 405. With the variable "Val" of "1" (one), the routine is advanced to step 409.

At step 405, the information-embedding unit 104 determines whether the variable "C" is an odd number. When the determination in step 405 is "NO", then the routine is advanced to step 413. When the determination in step 405 results in "YES", then the routine is advanced to step 406, at which a determination is made as to whether the variable "C" is greater than zero. When the determination in step 406 results in "YES", then the routine is advanced to step 408 at which "1" (one) is subtracted from the variable "C". When the determination in step 406 results in "NO", then the routine is advanced to step 407 at which "1" (one) is added to the variable "C". In either event, the variable "C" approaches "0" (zero).

At step 409, the information-embedding unit 104 determines whether the variable "C" is an even number. When the determination in step 409 results in "NO", then the routine is advanced to step 413. When the determination in step 409 results in "YES", then the routine is advanced to step 410, at which a determination is made as to whether the variable "C" is greater than zero. When the determination in step 410 results in "YES", then the routine is advanced to step 411, at which "1" (one) is subtracted from the variable "C". When the determination in step 410 results in "NO", then the routine is advanced to step 412 at which "1" (one) is added to the variable "C". In either event, the variable "C" approaches "0" (zero).

At step 413, the information-embedding unit 104 adds "1" (one) to the counter "i". Thereafter, the subsequent steps beginning at the step 402 are repeated.

As described above, the embedding information of, e.g., (13, 46) as illustrated in FIG. 10(a) is binarized to provide the bit string having the 16-bit length of (0, 0, 0, 0, 1, 1, 0, 1, 0, 0, 1, 0, 0, 1, 1, 0). In the bit string, the consecutive three bits at the head thereof are all "0's". These three 0-bits are comparable to DCT coefficients (32, 9, and −14). In the DCT coefficients (32, 9, and −14), the DCT coefficient (32) is an even number, and is unchanged; the adjacent DCT coefficient (9) is an odd number, and is changed to even number "8" near to "0"; and the next DCT coefficient (−14) is an even number, and is unchanged. Subsequently, similar processing is executed by the information-embedding unit 104, thereby providing results as illustrated in FIG. 10(b). Referring to FIG. 10(b), hatched rectangles are illustrated as the target coefficients.

Figure 2:
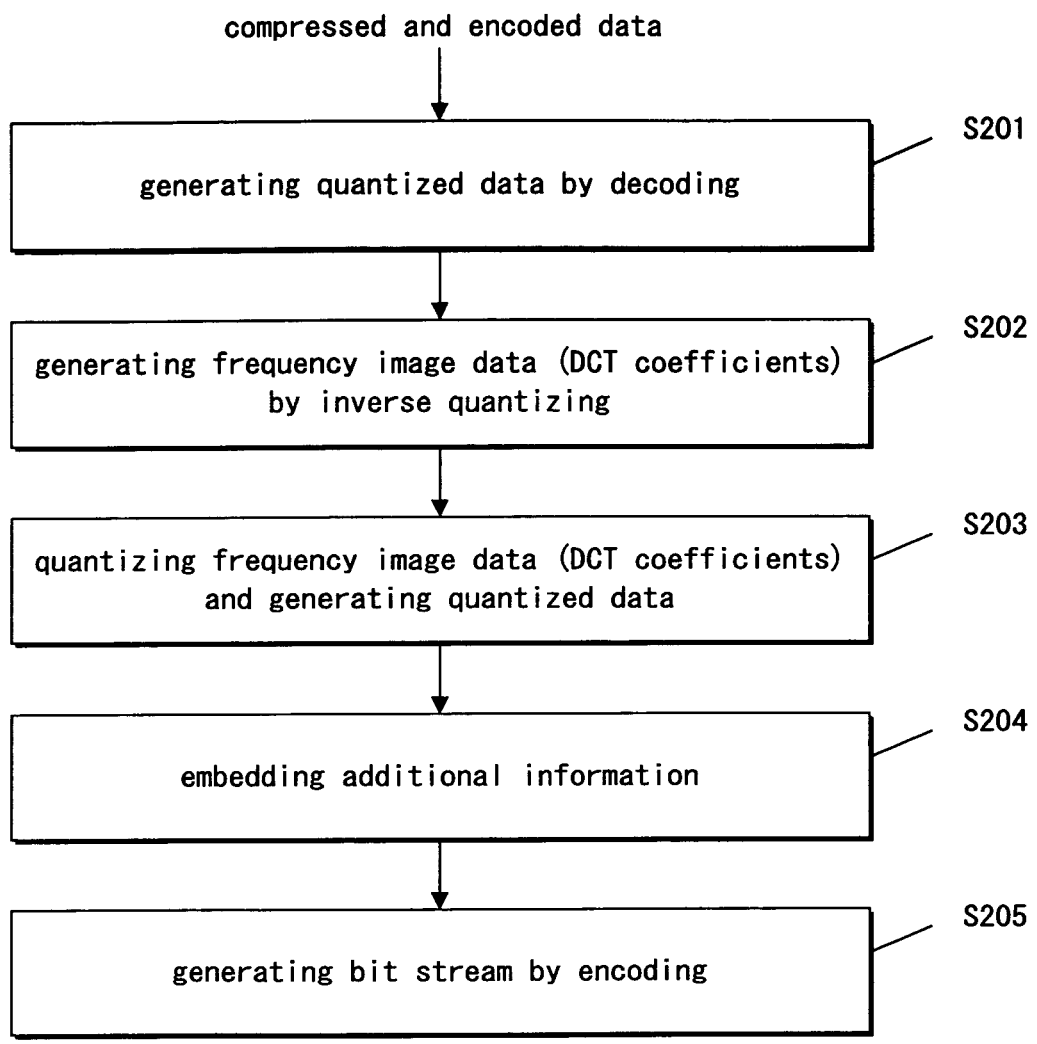
FIG. 2 is a flowchart illustrating a course of action provided by the image-processing apparatus according to the first embodiment.

The following discusses, with reference to FIG. 2, the entire processing executed by the image-processing apparatus according to the present embodiment. Referring to FIG. 2, a course of action provided by the image-processing apparatus of FIG. 1 is illustrated in flowchart form.

At step "S201", the decoding unit 101 performs the entropy decoding (e.g., Huffman decoding) of compressed and encoded data upon receipt thereof, thereby generating first quantized data. In general, with static images, the compressed and encoded data received by the decoding unit 101 are JPEG-data.

At step "S202", the inverse quantization unit 102 inversely quantizes the first quantized data from the decoding unit 101 using the first quantization table 106 used for quantization, whereby frequency image data is generated. The resulting frequency image data are DCT coefficients because they derive from the JPEG data.

At step "S203", the quantization unit 103 quantizes the frequency image data (DCT-coefficients) using the second quantization table of FIG. 4, thereby generating second quantized data. The second quantization table of FIG. 4 differs from the first quantization table 106 used by the inverse quantization unit 102. The elements in the second quantization table 107 are smaller in value than those in the first quantization table 106.

At step "S204", the information-embedding unit 104 processes the second quantized data from the quantization unit 103 in accordance with predetermined regulations, thereby embedding predetermined additional information into the second quantized data. As discussed above, the information-embedding method including the step of processing the quantized data in accordance with the predetermined regulation may include the step of changing values in the quantized data to either even numbers or odd numbers in dependence upon bit values in the additional information.

An embedded data amount is now described. For example, assume that 16-bit (2-bytes) additional information is embedded into an input image of 320×240 pixels at each DCT-block of 8×8 pixels. Therefore, twelve hundred numbers of the DCT-blocks are available from the input image of 320×240 pixels, and information equal in volume to a total of 2,400 bytes can be embedded therein.

At step "S205", the encoding unit 105 performs the entropy encoding (e.g., Huffman code) of the quantized data having the additional information embedded therein, thereby generating JPEG-compressed data having the additional information embedded therein.

The following discusses a specific comparison, with reference to FIG. 11, between the quantized DCT-coefficients having the information embedded therein by the image-processing apparatus according to the present embodiment, and the faithful use of the first quantization table 106 as the second quantization table 107, in which the first quantization table 106 has relative great values and a high compression ratio. Assume that pre-embedded, quantized DCT-coefficients are as illustrated in FIG. 11(a).

Under the above assumption, the present embodiment provides results as illustrated in FIG. 11(b). In this event, a sum of absolute values of differences between the pre-embedded, DCT-coefficients and post-embedded, DCT-coefficients is "54".

Meanwhile, under the same assumption as above, the faithful use of the first quantization table 106 as the second quantization table 107 provides results as illustrated in FIG. 11(c). In this event, the same sum as above is "124".

More specifically, the above sum according to the present embodiment is less than a half of the sum resulting from the faithful use of the first quantization table 106 as the second quantization table 107. In other words, it is appreciated that the present embodiment advantageously provides considerably suppressed degradation in image quality, although the same information is embedded in the quantized DCT-coefficients.

In conclusion, the image-processing apparatus according to the present embodiment is operable to quantize the encoded data having images compressed using the greater value-containing quantization table, by replacing a greater value of each of the elements in the quantization table by a smaller value. As a result, even with a minute change in value of the quantized data to embed the additional information therein, there is not so much great difference between values transformed by the inverse quantization and values prior to the embedment of the information. This feature allows a mass of additional information to be embedded into the compressed and encoded input data without a change in image quality of the aforesaid input data.

In the encoded data having images compressed using the greater value-containing quantization table or rather the first quantization table, almost all of the DCT coefficients in high frequency domain components are zeros, and are invariably zeros even when being re-quantized using the second quantization table. Accordingly, the additional information may be embedded into only the quantized data in intermediate and low frequency domain components, thereby achieving a lesser increase in code amount of the encoded data.

The compressed and encoded data in which the additional information is to be embedded is not limited to the JPEG-data, but may alternatively be moving image-encoded MPEG-data and JPEG-2000. In short, any encoded data associated with the quantization are acceptable.

As demonstrated by FIG. 5, not all of the elements in the second quantization table 107 must be smaller in value than those in the first quantization table 106. More specifically, only an element at an uppermost left position of the second quantization table 107, at which the additional information is to be embedded into the quantized data, may be smaller in value than the corresponding part of the first quantization table 106.

An originally smaller value-containing first quantization table 106 may be used as such without being replaced by the second quantization table 107 because such a first quantization table 106 provides similar advantages.

Preferably, features that form the image-processing apparatus according to the present embodiment are typically realized by storage units (e.g., a ROM, a RAM, and a hard disk) containing predetermined program data, and a CPU (central processing unit) operable to execute such program data. The program data may be introduced into the storage units through any storage medium such as a CD-ROM and a flexible disk.

The present invention provides an advantage that allows a mass of additional information to be embedded into the compressed and encoded input data without a change in image quality of such input data.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. An image-processing apparatus comprising:
   a first quantization table;
   a second quantization table different from said first quantization table;
   an inverse quantization unit operable to inversely quantize first quantized data using said first quantization table, thereby generating frequency image data;
   a quantization unit operable to quantize the frequency image data using said second quantization table, thereby generating second quantized data; and
   an information-embedding unit operable to embed additional information into the second quantized data,
   wherein each of said first and second quantization tables comprises elements at which the additional information is to be embedded, and wherein the elements in said second quantization table are smaller in value than the elements in said first quantization table.

2. An image-processing apparatus as defined in claim 1, further comprising:
   a decoding unit operable to decode compressed data, thereby generating the first quantized data; and
   an encoding unit operable to encode the second quantized data having the additional information embedded therein by said information-embedding unit, thereby generating compressed data.

3. An image-processing apparatus as defined in claim 1, wherein said information-embedding unit embeds the additional information in such a manner as to render a post-embedded value closer to "0"(zero) than a pre-embedded value.

4. An image-processing apparatus as defined in claim 1, further comprising:
   a table control unit operable to control values in said second quantization table based on values in said first quantization table.

5. An image-processing apparatus as defined in claim 1, wherein the elements at which the additional information is to be embedded are determined along a zigzag-scanning path that begins at a direct-current component.

6. An image-processing method comprising:
   inversely quantizing, using an inverse quantization unit, first quantized data using a first quantization table, thereby generating frequency image data;
   quantizing, using a quantization unit, the frequency image data using a second quantization table different from the first quantization table, thereby generating second quantized data; and
   embedding, using an information-embedding unit, additional information into the second quantized data,
   wherein each of the first and second quantization tables comprises elements at which the additional information is to be embedded, and wherein the elements in the second quantization table are smaller in value than the elements in the first quantization table.

7. A computer readable storage medium having an image-processing program recorded therein in a computer readable manner, said image-processing program causing a computer to execute a method comprising:
   inversely quantizing, using an inverse quantization unit, first quantized data using a first quantization table, thereby generating frequency image data;
   quantizing, using a Quantization unit, the frequency image data using a second quantization table different from the first quantization table, thereby generating second quantized data; and
   embedding, using an information-embedding unit, additional information into the second quantized data,
   wherein each of the first and second quantization tables comprises elements at which the additional information is to be embedded, and wherein the elements in the second quantization table are smaller in value than the elements in the first quantization table.

* * * * *

UNITED STATES PATENT AND TRADEMARK OFFICE
CERTIFICATE OF CORRECTION

PATENT NO. : 7,583,850 B2 Page 1 of 1
APPLICATION NO. : 11/017883
DATED : September 1, 2009
INVENTOR(S) : Hisashi Inoue et al.

It is certified that error appears in the above-identified patent and that said Letters Patent is hereby corrected as shown below:

In column 10, claim 7, line 30, "using a Quantization unit," should read --using a quantization unit,--

Signed and Sealed this

Twenty-ninth Day of December, 2009

David J. Kappos
*Director of the United States Patent and Trademark Office*